(12) United States Patent
Ducellier et al.

(10) Patent No.: US 6,487,334 B2
(45) Date of Patent: Nov. 26, 2002

(54) OPTICAL SWITCH

(75) Inventors: Thomas Ducellier, Ottawa (CA); Rajiv Iyer, Ottawa (CA); Andrew Tsiboulia, Nepean (CA); Paul Colbourne, Nepean (CA); Robert I. MacDonald, Manotick (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/988,267

(22) Filed: Nov. 19, 2001

(65) Prior Publication Data

US 2002/0090169 A1 Jul. 11, 2002

(30) Foreign Application Priority Data

Nov. 20, 2000 (CA) .............................................. 2326362

(51) Int. Cl.$^7$ .................................................. G02B 6/26
(52) U.S. Cl. ............................ 385/22; 385/15; 385/16; 385/17; 385/18; 385/33
(58) Field of Search ............................... 385/15, 16, 17, 385/20, 21, 22, 33, 18

(56) References Cited

U.S. PATENT DOCUMENTS

| | | | |
|---|---|---|---|
| 5,393,973 A | * 2/1995 | Blau | 250/221 |
| 5,461,227 A | * 10/1995 | Blau | 250/221 |
| 5,524,153 A | 6/1996 | Laor | 385/16 |
| 5,914,801 A | 6/1999 | Dhuler et al. | 359/230 |
| 6,002,818 A | 12/1999 | Fatehi et al. | 385/17 |
| 6,005,993 A | 12/1999 | MacDonald | 385/16 |
| 6,005,998 A | 12/1999 | Lee | 385/33 |
| 6,087,747 A | 7/2000 | Dhuler et al. | 310/90 |
| 6,097,858 A | 8/2000 | Laor | 385/16 |
| 6,097,859 A | 8/2000 | Solgaard et al. | 385/17 |
| 6,097,860 A | 8/2000 | Laor | 385/17 |
| 6,101,299 A | 8/2000 | Laor | 385/16 |
| 6,134,042 A | 10/2000 | Dhuler et al. | 359/224 |
| 6,253,001 B1 | 6/2001 | Hoen | 385/17 |
| 6,289,145 B1 | 9/2001 | Solgaard et al. | 385/17 |

FOREIGN PATENT DOCUMENTS

WO    WO 99/66354    12/1999

* cited by examiner

*Primary Examiner*—Brian Healy
(74) *Attorney, Agent, or Firm*—Neil Teitelbaum

(57) ABSTRACT

The invention provides an optical switch having an input port for launching a beam of light into the optical switch, at least two output ports, each output port for selectively receiving a beam of light, an ATO element having optical power for providing an angle to offset transformation, and beam directing means for selectively directing a beam of light from the input port to a selected one of the at least two output ports along an optical path via the ATO element. The ATO element is a lens or a mirror.

30 Claims, 14 Drawing Sheets

Image 1   Image 1 + 2   Image 1 + 2 + 3   Image 1 + 2 + 3 + 4

OPTICAL SWITCH

CROSS-REFERENCE TO RELATED APPLICATIONS

This applications claims priority from Canadian Patent Application No. 2,326,362 filed on Nov. 20, 2000.

MICROFICHE APPENDIX

Not Applicable

FIELD OF THE INVENTION

The present invention relates generally to optical switches and in particular to an optical switch based on the angle to offset principle.

BACKGROUND OF THE INVENTION

Optical matrix switches are commonly used in communications systems for transmitting voice, video and data signals. Generally, optical matrix switches include multiple input and/or output ports and have the ability to connect, for purposes of signal transfer, any input port/output port combination, and preferably, for N×M switching applications, to allow for multiple connections at one time. At each port, optical signals are transmitted and/or received via an end of an optical waveguide. The waveguide ends of the input and output ports are optically connected across a switch interface. In this regard, for example, the input and output waveguide ends can be physically located on opposite sides of a switch interface for direct or folded optical pathway communication therebetween, in side-by-side matrices on the same physical side of a switch interface facing a mirror, or they can be interspersed in a single matrix arrangement facing a mirror.

Establishing a connection between a given input port and a given output port, involves configuring an optical pathway across the switch interface between the input ports and the output ports. One way to configure the optical pathway is by moving or bending optical fibers using, for example, piezo-electric benders. The benders associated with fibers to be connected bend the fibers so that signals from the fibers are targeted at one another so as to form the desired optical connection across the switch interface. The amount of bending is controlled based on the electrical signal applied to the benders. By appropriate arrangement of benders, two-dimensional targeting control can be effected. Another way of configuring the optical path between an input port and an output port involves the use of one or more moveable mirrors interposed between the input and output ports. In this case, the waveguide ends remain stationary and the mirrors are used for switching. The mirrors can allow for one-dimensional or two-dimensional targeting to optically connect any of the input port fibers to any of the output port fibers and vice versa.

An important consideration in switch design is minimizing switch size for a given number of input and output ports that are serviced, i.e., increasing the packing density of ports and beam directing units. It has been recognized that greater packing density can be achieved, particularly in the case of a movable mirror-based beam directing unit, by folding the optical path between the fiber and the movable mirror and/or between the movable mirror and the switch interface. Such a compact optical matrix switch is disclosed in U.S. Pat. No. 6,097,860.

However, this approach in designing optical switches is to attach an individual lens collimator to each individual input and output port in order to "throw" the beam to the switching element and to the desired output port. For an N×M switch with a high port count, for example, this is a time consuming and costly procedure not to mention loss non-uniformity due to varying optical path lengths.

In accordance with the present invention, it is advantageous to move away from the traditional "beam-throwing" approach and move towards geometric and imaging optics, where elements having optical power, such as a minor or a lens or lens system, are used to image the entire input waveguide array to the beam directing means, the beams of which are then send through a switching core and finally imaged to the output waveguide array.

It is an object of this invention to provide a compact optical switch, modulator, attenuator, and/or blocker.

SUMMARY OF THE INVENTION

In accordance with the invention there is provided an optical switch comprising an input port for launching a beam of light into the optical switch, at least two output ports, each output port for selectively receiving a beam of light, an ATO element having optical power for providing an angle to offset transformation, and beam directing means for selectively directing a beam of light from the input port to a selected one of the at least two output ports along an optical path via the ATO element.

In accordance with an embodiment of the present invention, the ATO element is a mirror or a lens.

In accordance with a further embodiment of the invention, the beam directing means are substantially disposed near or at a focal plane of the ATO element. In accordance with one embodiment, the beam directing means is an array of micro-mirrors being optically coupled with the input port and any one of the at least two output ports. In accordance with a further embodiment, the beam directing means comprise a first array of micro-mirrors near or at a first focal plane and a second array of micro-mirrors near or at a second focal plane of the ATO element. The first array of micro-mirrors is for tilting the beam of light, said tilt being converted to a lateral displacement using the lens and imaged onto the second array of micro-mirrors for selectively redirecting the beam to any one of the at least two output ports.

In accordance with yet a further embodiment of the present invention, the beam directing means comprise input and output micro-mirrors, and wherein the beam directing means have a tilt with respect to light beams incident thereon for directing the light beams to an approximate center of an area occupied by respective output micro-mirrors.

In accordance with an embodiment of the invention, the ATO element has a focal length approximately equal to a near zone length or Rayleigh range of a beam of light incident on the ATO element. In this embodiment, the ATO element is employed for maintaining a radius of the beam of light on the beam directing means.

In accordance with a further embodiment of the present invention, the optical switch further comprises an imaging system for imaging a beam of light onto the beam directing means. The imaging system can comprise reflective or transmissive elements. In accordance with one embodiment, the imaging system comprises at least one lens, and in another embodiment it comprises a telecentric imaging system. If desired, the telecentric imaging system is an off-axis telecentric imaging system.

In accordance with yet another embodiment of the present invention the optical switch further comprises a micro-lens centered on an optical axis of the input port for increasing an optical filling factor by increasing a beam diameter of the beam of light.

In another embodiment of the invention, the optical switch further comprises optical fibers at the input port and the plurality of output ports. In order to increase an optical filling factor, a portion of a cladding of the optical fibers is etched, or alternatively the optical fibers are drawn at an elevated temperature to have a reduced diameter.

In accordance with another embodiment of the invention, a parallel projection is used for increasing the optical filling factor.

In accordance with the invention, there is further provided an optical switch comprising an input port for launching a beam of light into the optical switch, at least two output ports, each output port for selectively receiving a beam of light, an ATO element having optical power and for providing an angle to offset transformation, and beam directing means for selectively directing a beam of light from the input port to a selected one of the at least two output ports along an optical path via the ATO element, said beam directing means being disposed near or at a focal plane of the ATO element.

In an embodiment of the present invention the ATO element is a curved mirror or a transmissive lens.

The present invention provides for beam directing in a transmissive or reflective configuration.

In accordance with another aspect of the invention, there is provided an optical switch comprising an array of controllable deflecting elements for switching a beam of light, and an ATO element optically coupled with the array of controllable deflecting elements for providing an angle to offset transformation, said array of controllable deflecting elements being disposed near or at a focal plane of the ATO element, and wherein a switching is performed along an optical path via the ATO element.

In accordance with the present invention there is further provided a modulator, attenuator, and/or blocker comprising an ATO element having optical power.

BRIEF DESCRIPTION OF THE DRAWINGS

Exemplary embodiments of the invention will now be described in conjunction with the drawings in which.

DETAILED DESCRIPTION OF THE PREFERRED EMBODIMENTS

Figure 1:
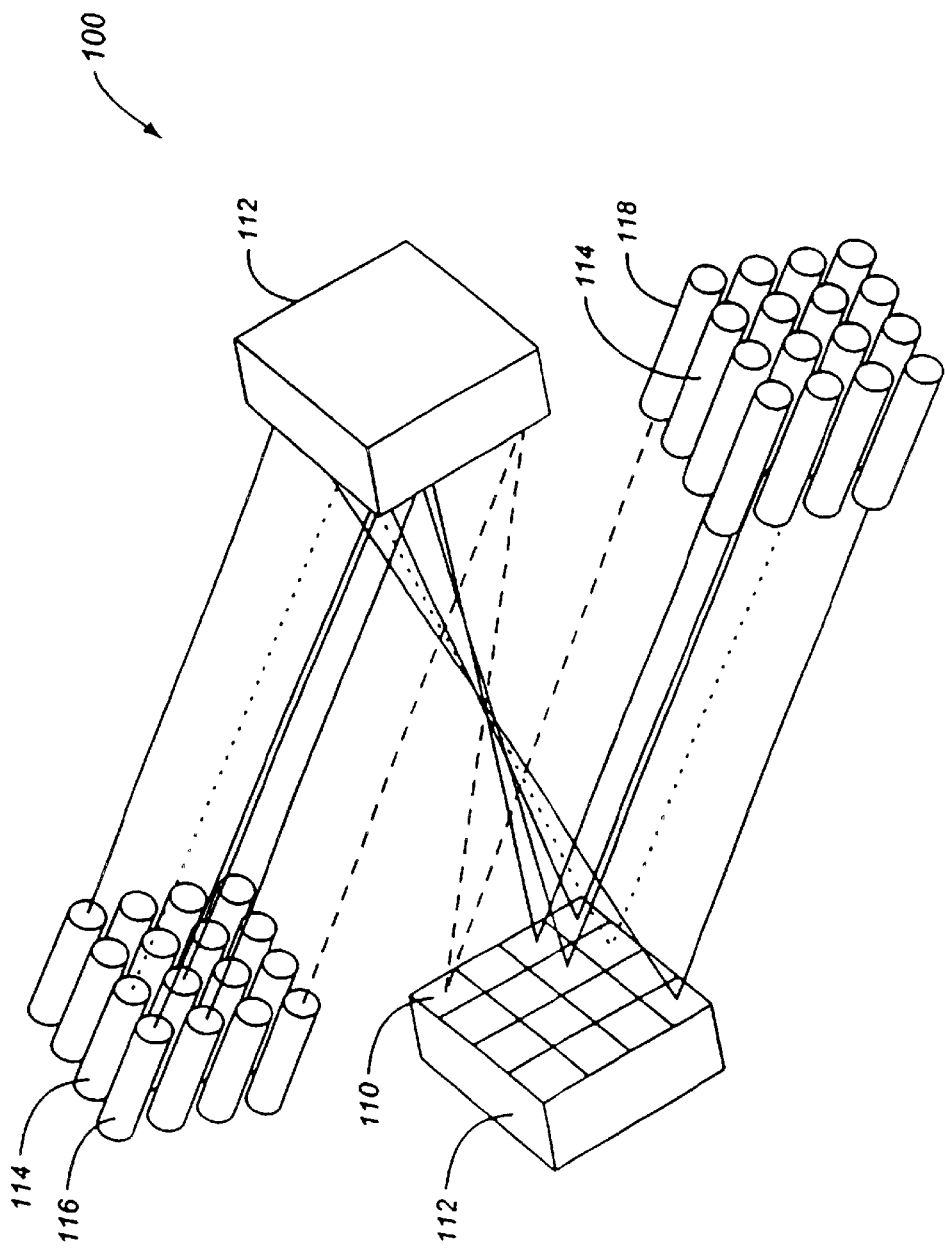
FIG. 1 shows a prior art optical switch wherein the beam of each input waveguide is individually collimated.

Turning now to FIG. 1, a prior art optical switch or cross-connect structure 100 is shown, wherein micro-mirrors 110 on a MEMS chip 112 are used to fold the design. The folded optical pathway configuration allows for a compact switch design using the movable mirror based beam directing unit. However, the general approach in prior art optical cross connectors is to individually collimate the beam from each input waveguide and to direct this beam to its dedicated mirror. This mirror then deflects the beam to any one of the plurality of output mirrors which then redirects the beam, i.e. compensates for the angle, to its dedicated output waveguide. As is seen from FIG. 1, this design requires the use of a lens 114 for each individual input fiber of input fiber bundle 116 and each individual output fiber of output fiber bundle 118.

In traditional imaging optics, angles are not converted to offsets in the image plane, but in fact, back into angles, and based on the optical imaging system used with a certain magnification. In accordance with the present invention, a new optical system is used that is optically separated from the imaging system. This is explained in more detail below in conjunction with the explanation of the ATO principle.

As will be described later, the optical device in accordance with the invention includes an optical sub-system, an input imaging system (IIS), to image the input channel or channels to its set of beam directing means (BDM1), and another optical sub-system, an output imaging system (OIS), to image the output channel or channels to its set of beam directing means (BDM2). Between BDM1 and BDM2, an ATO element is placed which (a) enables the interconnect means by serving as the switching core, and (b) keeps the optical path length substantially equal for all possible switching paths. This provides for loss uniformity.

Now, if the manifestation of the switch requires that the IIS be optically identical, i.e. symmetric, to the OIS, there is an additional requirement that the beam sizes on either optical side of the ATO element be identical. This is generally not the case, however, there is one special case when this is true, which is termed "True ATO" to point out the fact that only angles are converted to offsets without any mode size conversion. The "True ATO" principle can be described in terms of Geometric Optics or in terms of Gaussian Beam Optics.

True ATO Principle Described Through Geometric Optics

Figure 2:
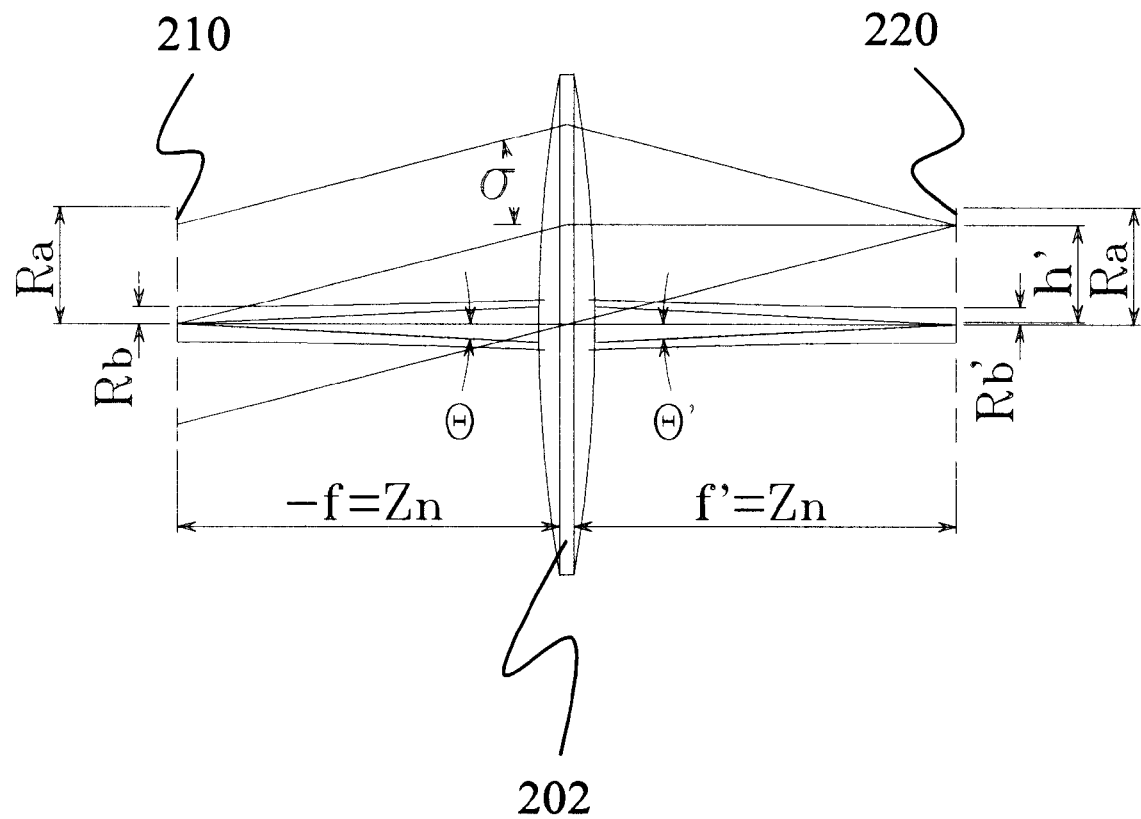
FIG. 2 describes the ATO principle through geometric optics by means of an Angle-To-Offset Lens (ATOL)

FIG. 2 explains the true ATO principle using the fundamentals of geometric optics by means of an Angle-to-Offset Lens (ATOL) 202. FIG. 2 shows an array of N light beams with their beam waists situated at plane 210. This array occupies an area, and for the purpose of this description, it is assumed that this area is a circle with a radius Ra. Each of these beams has the waist beam radius Rb and semi-divergence angle θ. The length of the near-zone of all these beams is $Z_n=R_b/\theta$. In accordance with the present invention, any one of these beams is to be directed to any point within another area, and for the purpose of this description, it is assumed that this area is a circle with a radius $R_a$ in plane 220. Further, in accordance with this description, all of these beams have their waists at plane 210 and 220, having the same beam radius $R_b$ and the same semi-divergence angle θ. Plane 210 is the front focal plane of the ATOL 202, and plane 220 is its rear focal plane. The effective (rear) focal length of the lens f is equal to $Z_n$, the length of the near zone of all the light beams.

The beam waist radius at plane 220 is equal $R_b'=\theta f'=\theta Z_n=R_b$. The beam semi-divergence angle after the lens is $\theta'=R_b/f'=R_b/Z_n=\theta$. Thus, the beam waist radius and divergence remain the same after the lens. The position of the beam axis at plane 220 is equal to $h'=-\sigma f'$, where σ is the beam axis tilt angle at plane 210. It is defined entirely by this angle, and hence by steering this angle at plane 210 within the range $\Delta\sigma_b=\pm R_a/Z_n$, a beam is directed to any point at plane 220 within a circle of radius $R_a$.

The diameter of the ATOL 202 is chosen to be not less than $$D_A = 2\ R_a + 2\Delta\sigma f' + 2\theta f'.$$

This description applies to both, multi-mode and single-mode fiber light beams. The semi-divergence angle of a single-mode light beam is equal to $\theta=\lambda/(\pi\omega_b)$ The near zone of a single-mode light beam is called Raleigh range and is equal to $Z_n=\pi\omega_b^2/\lambda$, where $\omega_b$ is the single-mode beam waist radius defined at the $1/e^2$ energy level and λ is the wavelength. This is described in further detail below.

True ATO Principle Described Through Gaussian Beam Optics

The beam power of a Gaussian beam is principally concentrated within a small cylinder surrounding the beam axis. The intensity distribution in any transverse plane is described by a circularly symmetric Gaussian function centered about the beam axis. The width of this function is at a minimum (as a function of z, the direction of beam propagation) at the beam waist and grows gradually in both directions. Within any transverse plane, the beam intensity assumes its peak value on the beam axis and drops by the factor $1/e^2$ at the radial distance $\rho=W(z)$. W(z) is regarded as the beam radius and about 86% of the beam power is carried within a circle of this radius W(z). The dependence of the beam radius on z is described by the following equation:

$$W(z) = W_0 \left[1 + \left(\frac{z}{z_0}\right)^2\right]^{\frac{1}{2}}$$

The parameter $z_0$ is known as the Rayleigh range or near zone and denotes a distance where the area of the beam doubles.

General Gaussian beam theory states that if the input waist of $1/e^2$ beam radius $W_1$ is placed at the front focal plane of a lens of focal length F then the output waist of $1/e^2$ beam radius $W_2$ is located at the back focal plane of the lens. The relationship between these radius sizes is shown in the following equation $$W_2 = \frac{F\lambda}{\pi W_1}$$

It is apparent from this equation that the input beam size can be made equal to the output beam size by selecting an appropriate focal length F. This focal length is proportional to the square of the beam radius, and is equal to the Raleigh range of the input beam. This applies also in an analogous manner to a mirror, another element having optical power, where the front and back focal plane coincide.

$$W_2 = W_1$$

$$f = z_0 = \frac{\pi W_0^2}{\lambda}$$

Figure 3A:
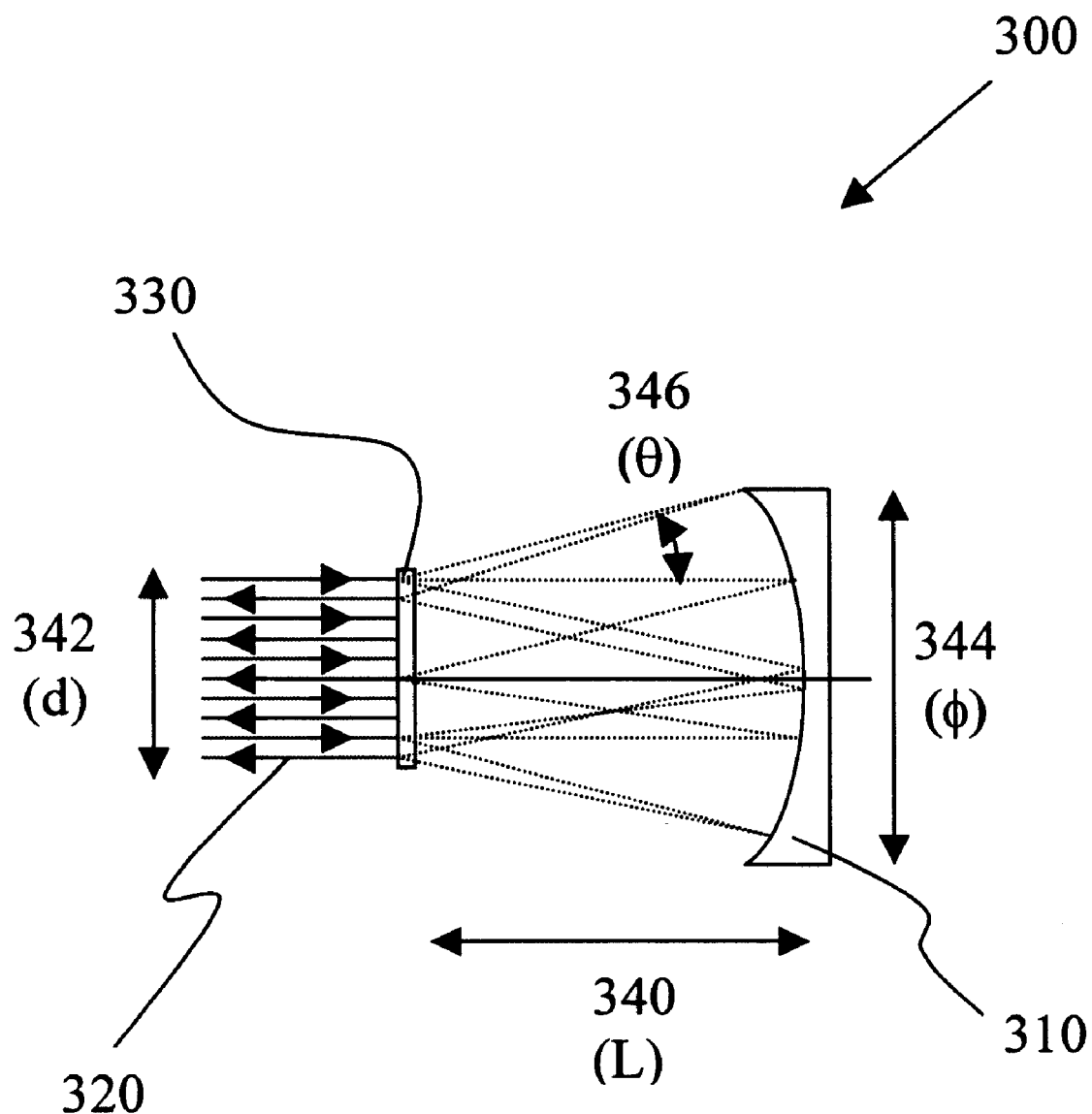
FIG. 3a shows a basic optical system for an optical switch in accordance with the present invention based on an Angle-to-Offset Mirror (ATOM)

FIG. 3a presents a basic optical system for an optical switch 300 in accordance with the present invention based on an Angle-to-Offset Mirror (ATOM) 310. A waveguide bundle 320 is shown on the left of FIG. 3a with arrowheads denoting respective interleaved input and output ports of the switch 300. Interleaved input and output beam directing means 330 are provided using a transmissive deflection mechanism in order to angularly direct the beam to a certain point of the ATOM 310 so that the beam is deflected to a respective output port of waveguide bundle 320. The beam directing means 330 include means for directing the beam of light from the input waveguides to the ATOM and from the ATOM to the output waveguides. Exemplary embodiments of beam directing means 330 are described in more detail below. It is apparent, that the beam can be directed to any one of the output ports of waveguide bundle 320 by appropriately selecting the deflection point on ATOM 310. In accordance with an embodiment of the present invention, ATOM 310 has a focal length L 340 corresponding to the near zone length or Rayleigh range. Such an arrangement provides a compact optical system in which the necessary deflection angles are reduced by a factor of two and further avoids excess losses due to a defocusing. If desired, a focal length L 340 of ATOM 310 is chosen to be different from the near zone length or Rayleigh range. In order to determine the switch dimensions the following scaling factors are used: an F# of the ATOM 310, an area filling factor for micro-beams (K), and a linear number of ports (N); for example N=64 for a square grid of 4096 to build an M×M 4096×4096 optical switch. The dimensions of the optical switch 300 are determined by the diameter (φ) 344 of the ATOM 310

$$\phi = \frac{L}{F\#},$$

the divergence angle (θ) 346.

$$\tan(\theta) = \frac{1}{4F\#},$$

the diameter (d) 342 of the waveguide bundle 320

$$d = \frac{18(2N-1)^2\lambda}{K\pi}F\#, \text{ and}$$

the focal length (L) 340 of the ATOM 310

$$L = \frac{36(2N-1)^2\lambda}{K\pi}F\#^2.$$

The deflection mechanism of beam directing means 330 can be an arrangement of single or dual tilt mirrors or an arrangement of a wedge on a dual tilt mount.

Figure 3B:
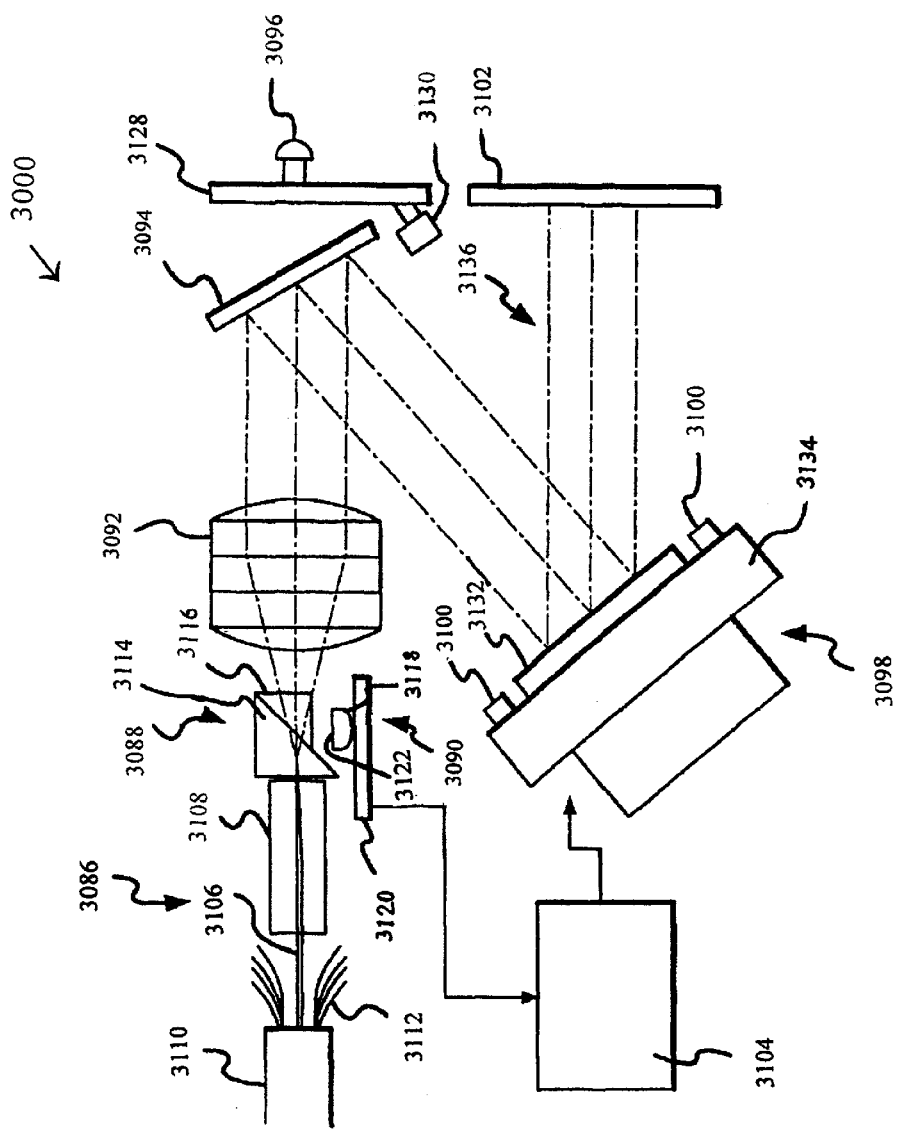
FIG. 3b shows a prior art example of an optical switch wherein a beam steering in transmission is accomplished using a mirror assembly for doubly deflecting a light beam.

FIG. 3b shows a prior art optical module 3000 wherein a beam steering in transmission is accomplished using a mirror assembly for doubly deflecting the beam. Optical switch 3000 is described in more detail in U.S. Pat. No. 6,101,299, the contents of which is incorporated herein by reference. The optical path of switch 3000 is generally indicated at 3136. Referring further to FIG. 3b, optical switch 3000 includes a fiber assembly 3086, a signal separator 3088, a sensor unit 3090, a lens assembly 3092, a stationary mirror 3094, a targeting radiation emitting devices (RED) 3096, a moveable milTor assembly 3098 with mounted alignment radiation emitting devices (REDs) 3100, a window 3102 and a processor 3104. The fiber assembly 3086 includes a conventional optical fiber 3106 for use in transmitting optical communication signals, a ferrule 3108, and a fiber cable 3110 including strength members 3112. The ferrule 3108 holds the bare fiber 3106 adjacent to the signal separator 3088.

The separator 3088 separates the control signals from the communication signals so that the control signals are received by the sensor unit 3090 and the communication signals are received by fiber 3106. The illustrated separator 3088 is a dichroic beam splitter, formed from two prismatic blocks 3114 and 3116.

The sensor unit 3090 includes a sensor chip 3118 mounted on a printed circuit board 3120.

The lens assembly 3092 receives incoming signals (via window 3102, mirror assembly 3098, and mirror 3094) and focuses the signals on fiber 3106. The lens assembly 3092 also receives outgoing signals from fiber 3106 and transmits such signals in a focused beam through window 3102 via mirror 3094 and mirror assembly 3098. The lens assembly 3092 can be an appropriate lens doublet or triplet for providing the desired optical performance.

Mirror 3094 is provided primarily for optical path folding. RED 3096 is mounted on a circuit board 3128 for providing the proper power signals to control pulsing of the RED 3096. A radiation detector 3130 is also mounted on board 3128 facing the REDs 3100 mounted on assembly 3098. This detector 3130 measures the amount of radiation emitted by the REDs for calibration and maintenance purposes.

FIG. 3b generally shows that the transmitted signal is collected by lens assembly 3092 to form a beam for transmission across the switch interface.

The moveable mirror assembly 3098 includes moveable mirror surfaces 3132 with related control elements and REDs 3100 mounted on a housing 3134. The assembly 3098 is used to actuate both targeting and alignment adjustments. The mirror surfaces 3132 move in response to commands from processor 3104 to allow for adjustment of the optical path of the communication and control signals received through window 3102 in two dimensions relative to the fiber 3106 and sensor unit 3090.

Figure 3C:
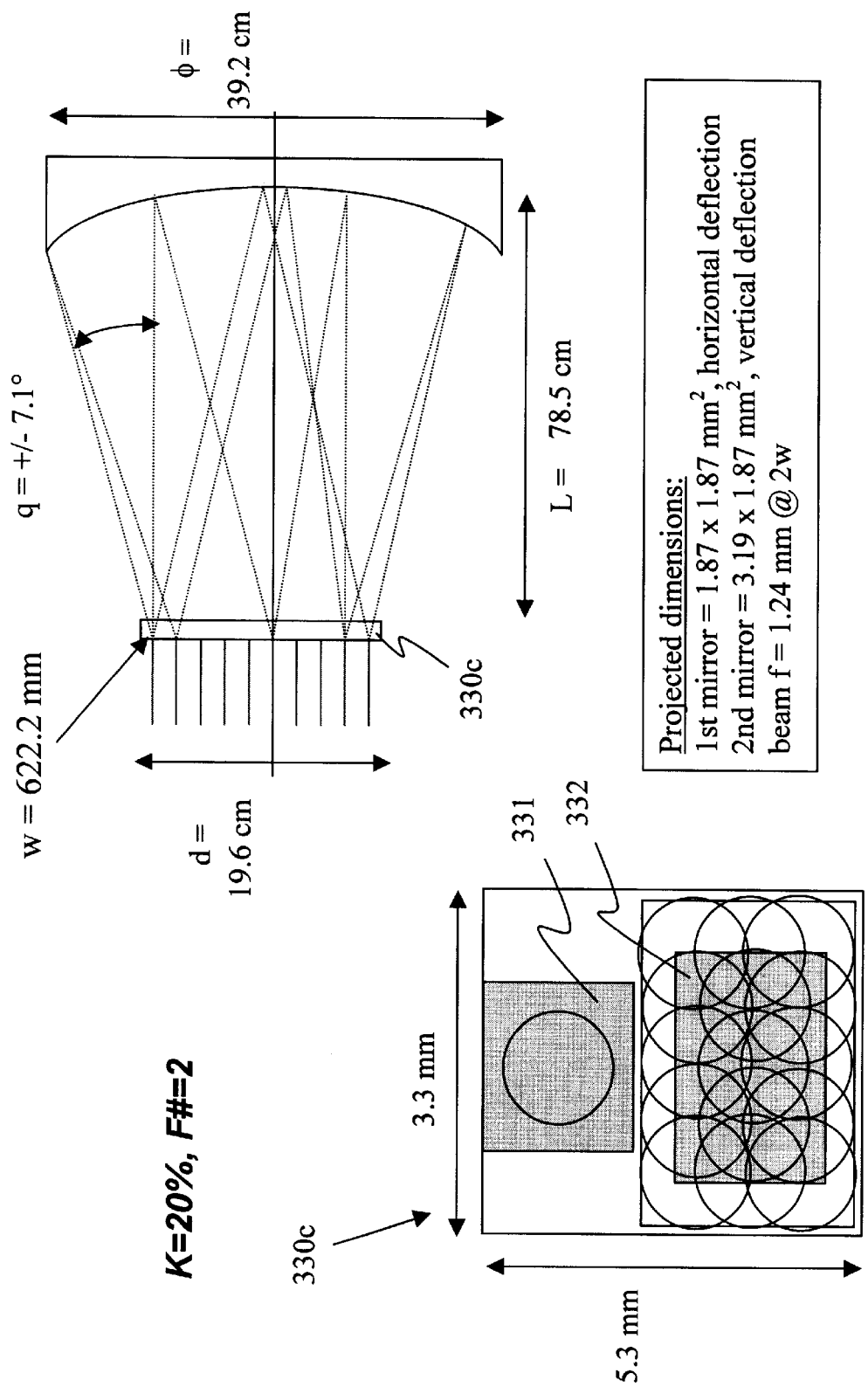
FIG. 3c shows an exemplary embodiment of the basic optical system presented in FIG. 3a having a dual mirror arrangement as beam directing means.

Referring now to FIG. 3c a further exemplary embodiment of beam directing means 330c of a 576×576 switch is presented. Again, beam steering in transmission is achieved by using a dual mirror arrangement and deflecting a beam of light from both mirrors. Beam directing means 330c include a first movable mirror 331 operable in one-dimensional horizontal deflection. As a result of the horizontal beam steering, a second rectangular movable mirror 332 is provided to capture the light from mirror 331. Mirror 332 is operable in one-dimensional vertical deflection. However, such an arrangement is optically not efficient as can be seen from the dimensions of beam directing means 330c (3.3 mm×5.3 mm) and the overall dimension of the switch (φ=39.2 cm, L=78.5 cm, d=19.6 cm).

Figure 3D:
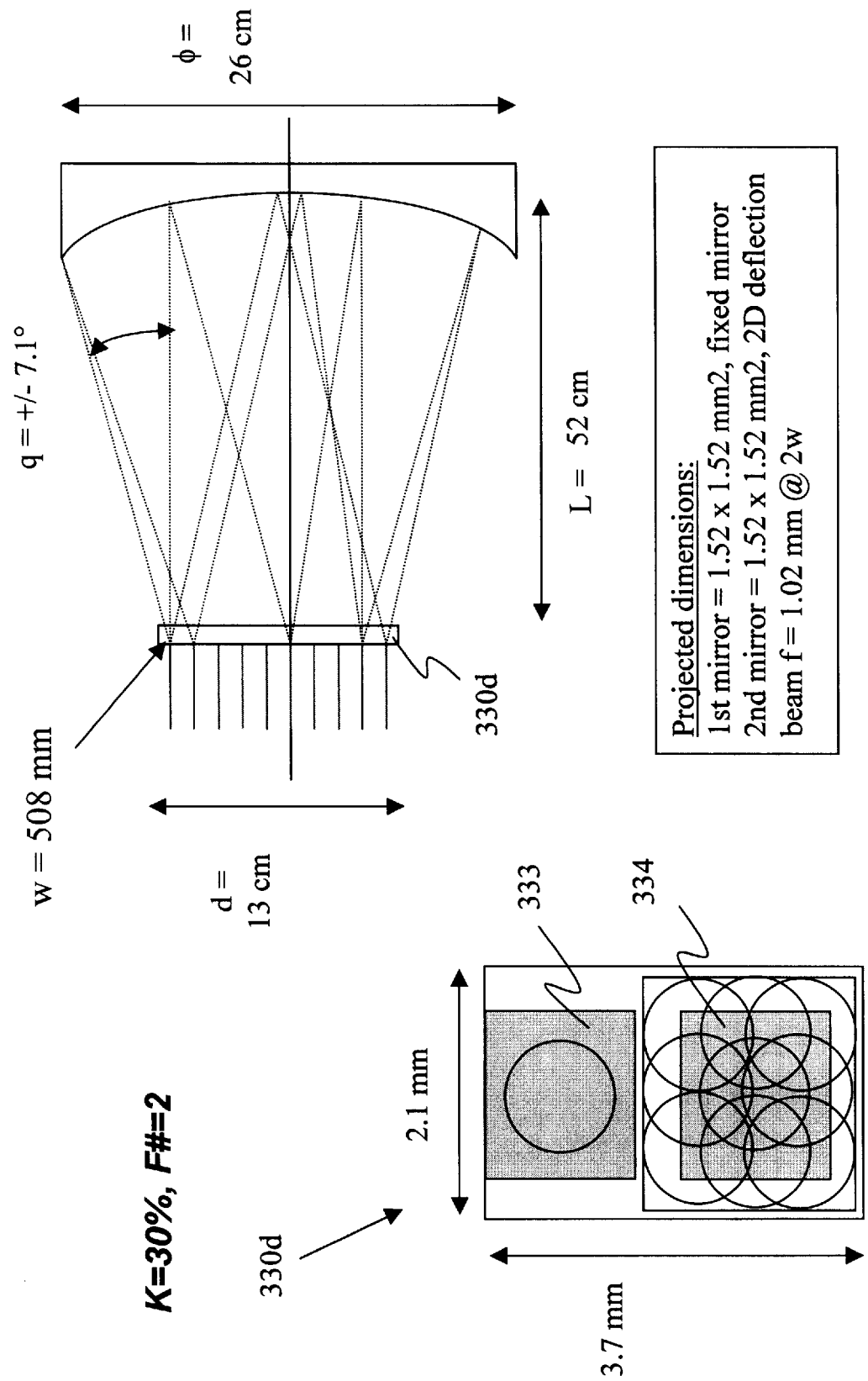
FIG. 3d shows another example of the basic optical system presented in FIG. 3a having a different dual mirror arrangement as beam directing means.

Referring now to FIG. 3d another exemplary embodiment of beam directing means 330d of a 576×576 switch is presented. Beam directing means 330d present a more optically efficient example of beam steering in transmission employing a first fixed mirror 333 and a second movable mirror 334 which affords a two-dimensional deflection. The smaller size of the beam directing means 330d (2.1 mm×3.7 mm) and the overall size of the switch (φ=26 cm, L=52 cm, d=13 cm) demonstrate that this design of the beam directing means is optically more efficient when compared to beam directing means 330c.

Figure 3E:
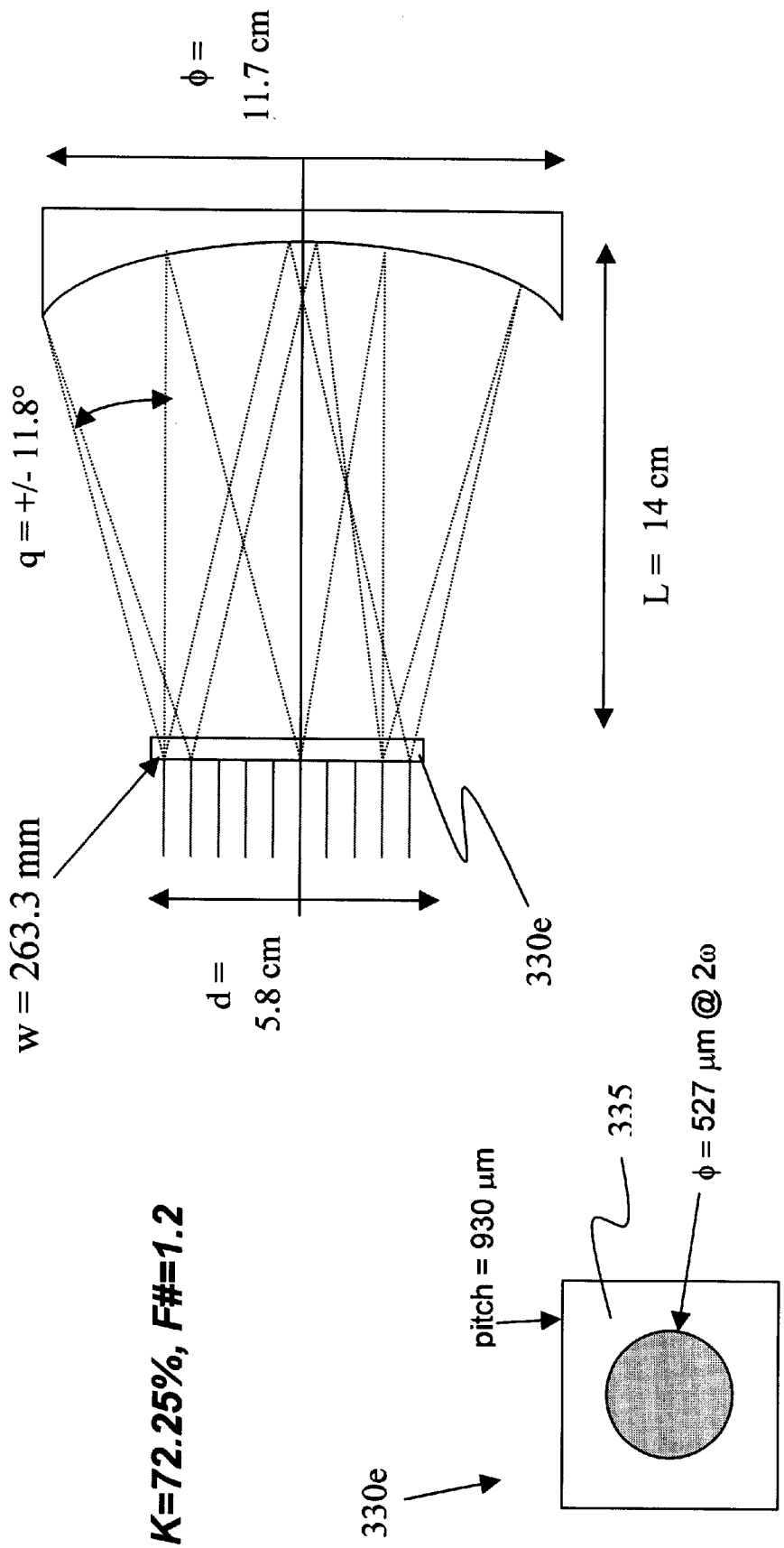
FIG. 3e shows yet another example of the basic optical system presented in FIG. 3a having compact beam directing means.

FIG. 3e presents an even more optically efficient example of beam directing means 330e of a compact 1024×1024 optical switch in accordance with the invention. In this embodiment, the input fiber is moved in front of the collimator. The beam steering in transmission can be achieved by deflector 335. Deflector 335 can be a liquid crystal phase array or a tiltable prism/microprism. In accordance with this embodiment, the overall dimensions of the switch are smaller (φ=11.7 cm, L=14 cm, d=5.8 cm) when compared to the embodiments presented in FIGS. 3c and 3d.

Figure 4:
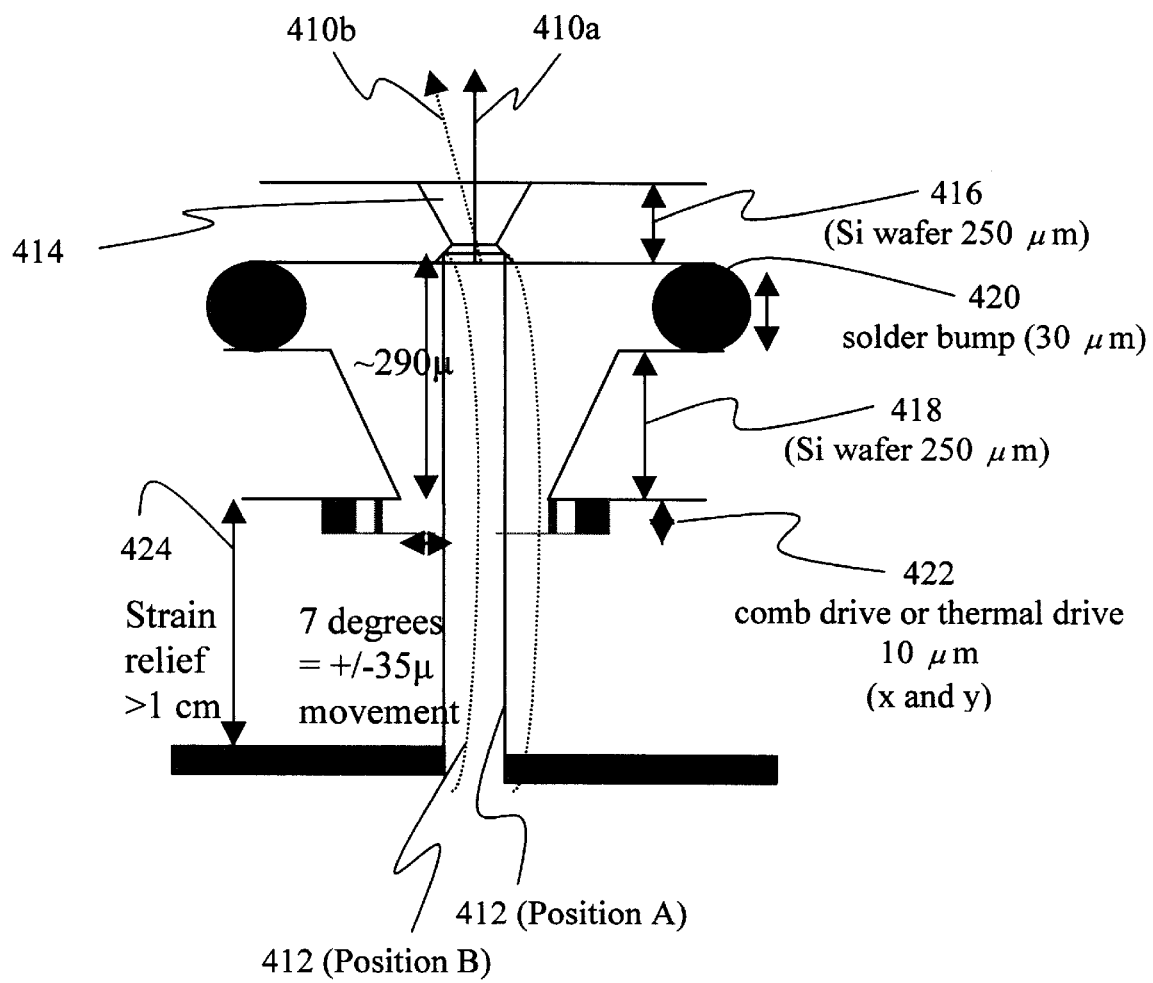
FIG. 4 shows another example of beam directing means in form of a MEMS device.

Alternatively, a MEMS device 400, such as shown in FIG. 4, can be used as a transmissive deflector. This MNEMS device 400 changes an axis of an optical cone of a beam of light emitted by the waveguide but keeps its "vertex" in place. This change is indicated by dotted lines in FIG. 4 and by repositioning the waveguide 412 from position A to position B, the axis of the optical cone changes from 410a to 410b, respectively. Waveguide 412 is placed into a small countersunk bearing hole 414 of a top chip 416 (Si wafer 250 μ) of MEMS device 400. The bottom chip 418 (Si wafer 250 μ) is bonded to the top chip 416 with solder bumps 420 (30 μ), which can give interwafer distances controllable to submicron accuracy. The waveguide 412 passes through a hole in this wafer/bottom chip 418, and is engaged by an x–y positioner 422, such as a comb drive or a thermal drive. In order to apply a larger force on waveguide 412, two comb drives or two thermal drives are provided. The waveguide continues for some distance to a strain relief fixture 424, to avoid a possible fracture of the waveguide for example. The required actuation for a +/−7 degree steering with the dimensions shown in FIG. 4 is about +/−35 to 40μ.

Figure 5:
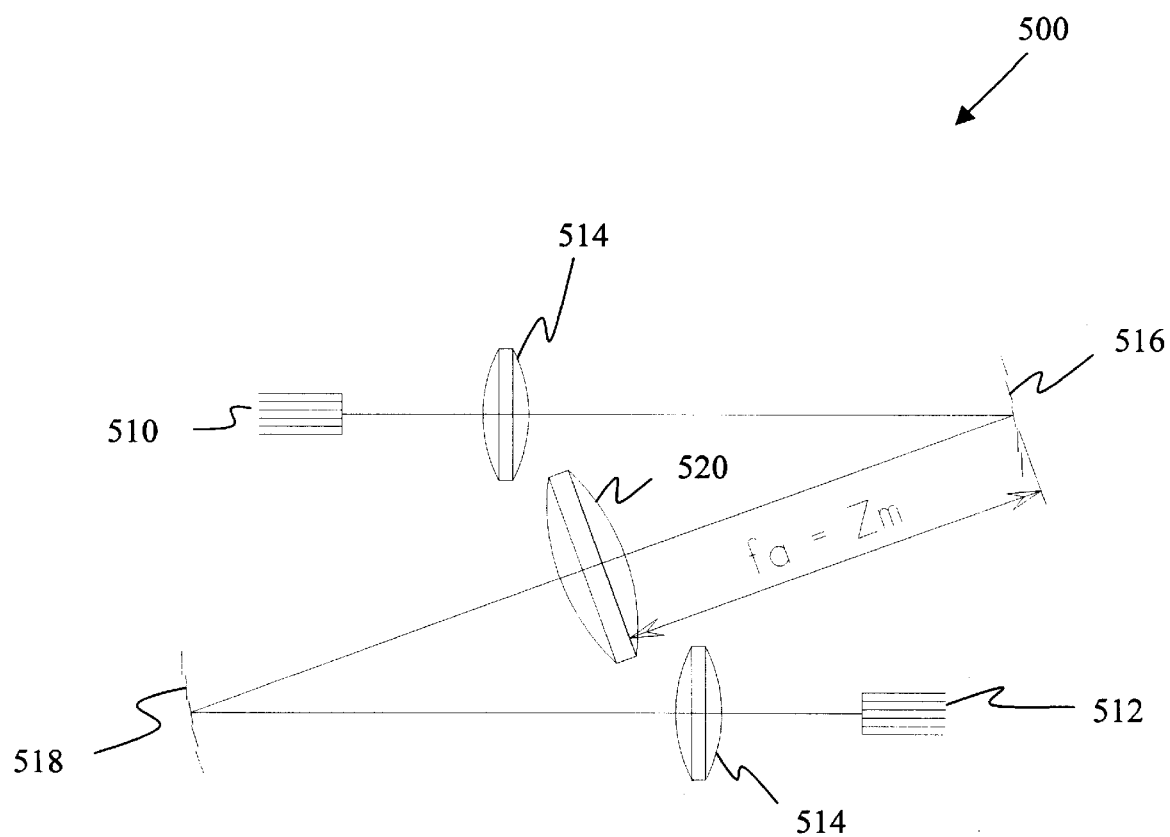
FIG. 5 shows an optical switch in a transmissive configuration in accordance with the invention based on an ATOL and MEMS chips.

FIG. 5 shows another embodiment of the present invention wherein the optical switch 500, drawn in a transmissive configuration, is based on an Angle-To-Offset Lens (ATOL) as the element of optical power and two MEMS chips. Switch 500 has an input waveguide bundle 510 and output waveguide bundle 512, imaging lenses 514, an input MEMS chip 516 and an output MEMS chip 518, and an ATOL 520. The description presented herein only discusses the light issued from the input bundle 510, i.e. the input side of the system 500. Since this is a symmetric system and since light is generally bidirectional, the description also applies to the output side.

Each fiber end-face is imaged onto a respective micro-mirror on the NMEMS chip 516 using imaging lens 514. In a true ATO case, the focal length fa of the ATOL 520 is substantially equal to the near-zone length (multimode) or the Rayleigh range (single mode) of the beam at the MEMS plane and thus, the MEMS chips 516 and 518 are placed at the front and back focal planes of the ATOL 520, as shown in FIG. 5. By properly directing two micro-mirrors of the two MEMS chips 516 and 518, a link between any two waveguides from the input waveguide bundle 510 to the output waveguide bundle 512 is established. Thus, the MEMS chips 516 and 518 fulfill the function of beam directing means. The micro-mirrors on the MEMS chip 516 introduce a tilt of each input beam which is converted to a lateral displacement with the same mode size through the ATOL onto a set of output micro-mirrors on the second MEMS chip 518 which redirect these beams to the outputs at the output waveguide bundle 512. The range of the mirror steering is one-half the range of the beam steering as shown in the following equation, see also the section describing the ATO principle through geometric optics, $$\Delta\sigma_b = \pm R_a/2 \, Z_n.$$

The beam axes between the input waveguide bundle 510 and imaging lens 514 are parallel to each other, or telecentric; however, they cease to be telecentric as they propagate from the imaging lens 514 to the MEMS chip 516. The skew angle of the beam axis after lens 514 is $\phi' = h/f'$, where h is one-half of the size of the waveguide bundle, or expressed alternatively, the height of the fiber bundle from the optical axis. Therefore, the skew angle needs to be compensated by non-uniform tilting of each micro-mirror on the MEMS chip 516 which results in an increase of the required angle of mirror steering. However, it is desirable to minimize the total required angle of micro-mirror deflection, and in accordance with a further embodiment of the present invention a second magnifying system is included in order to image the beams from the MEMS chip to the ATO lens. The use of a second magnifying lens provides additional room, if needed, and magnification to increase the mode size in the case that the focal length of the ATO lens 520 is too small. However, it is advantageous to replace lenses 514 with a telecentric 4-f relay magnifier. Replacing lenses 514 by telecentric systems of the same magnification ensures a telecentricity of the beam axes as they approach the MEMS chip which obviates an increase in the range of mirror steering. In this case the range of mirror steering remains the same as it was described above with the following equation $\Delta\sigma_b = \pm R_a/2 \, Z_n$.

Figure 6:
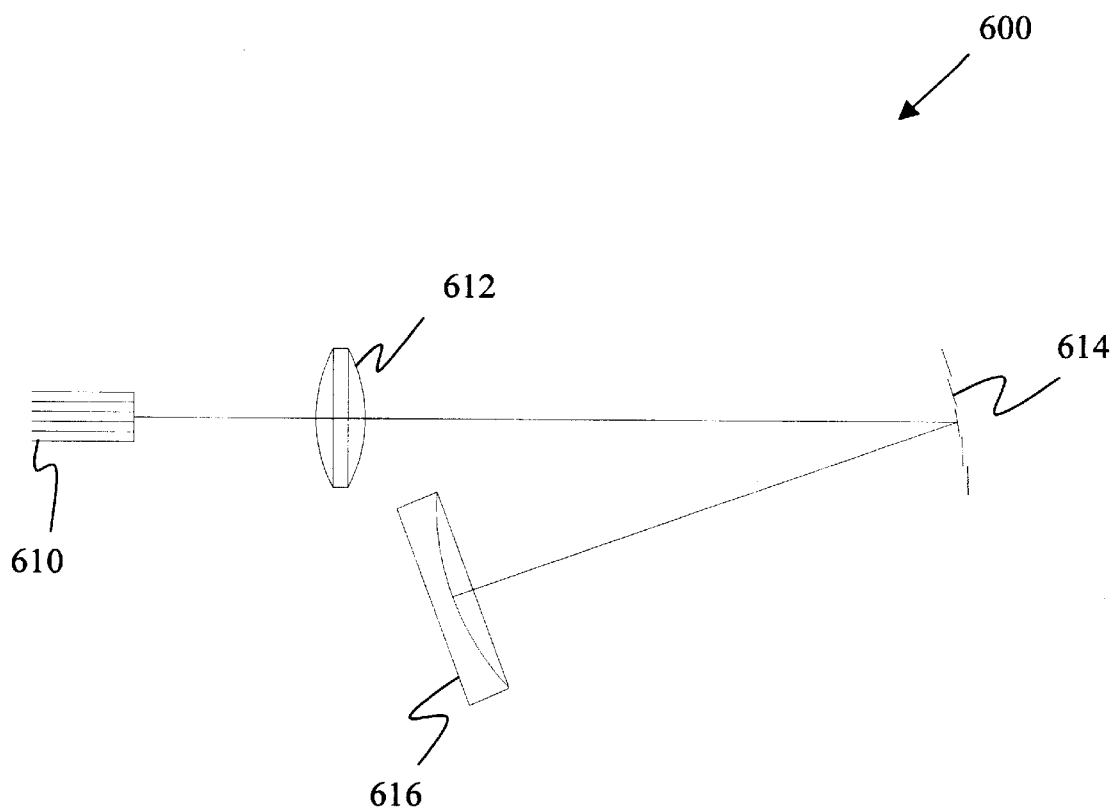
FIG. 6 shows an optical switch in accordance with the invention based on an ATOM and a MEMS chip.

FIG. 6 shows another autocollimative/reflective optical switch 600 based on a focusing Angle-To-Offset Mirror (ATOM). Its operation is similar to the optical switch 300 described in conjunction with FIG. 3. However, switch 600 employs a MEMS chip 614 having a micro-mirror arrangement thereon for directing the beam to a respective deflection point on the ATOM 616. Aside from the ATOM 616, switch 600 has a waveguide bundle 610, a projective lens 612, and a MEMS chip 614. Again, it is advantageous to use a telecentric magnifier for the projective lens 612. Input waveguides and output waveguides are mixed together in waveguide bundle 610 and hence, the port count of optical switch 600 is reduced. In accordance with this embodiment of the invention, the micro-mirrors on the MEMS chip comprise the micro-mirrors dedicated for directing the input signals as well as the output signals. The layout of the micro-mirrors on the MEMS chip 614 depends on the assignment of the input port or ports and the output ports on the waveguide bundle 610, i.e. whether they are sectioned in groups or interlaced, for example.

Furthermore, as is seen from FIGS. 5 and 6, the MEMS chips are shown to be tilted with respect to incident light beams in order to keep the individual micro-mirrors unbiased, i.e. no tilt is introduced to the individual micro-mirrors on the MEMS chips. It is desired to keep the beam deflectors/micro-mirrors unbiased so that they direct all input light beams to an approximate center of an output MEMS chip after passing through the ATO element. In the case of the reflective embodiment presented in FIG. 6, the beams reflected from the input/output MEMS chip are made to be incident on a center of the area occupied by respective output micro-mirrors of the same input/output HEMS chip after being reflected by the ATO mirror.

Figure 6A:
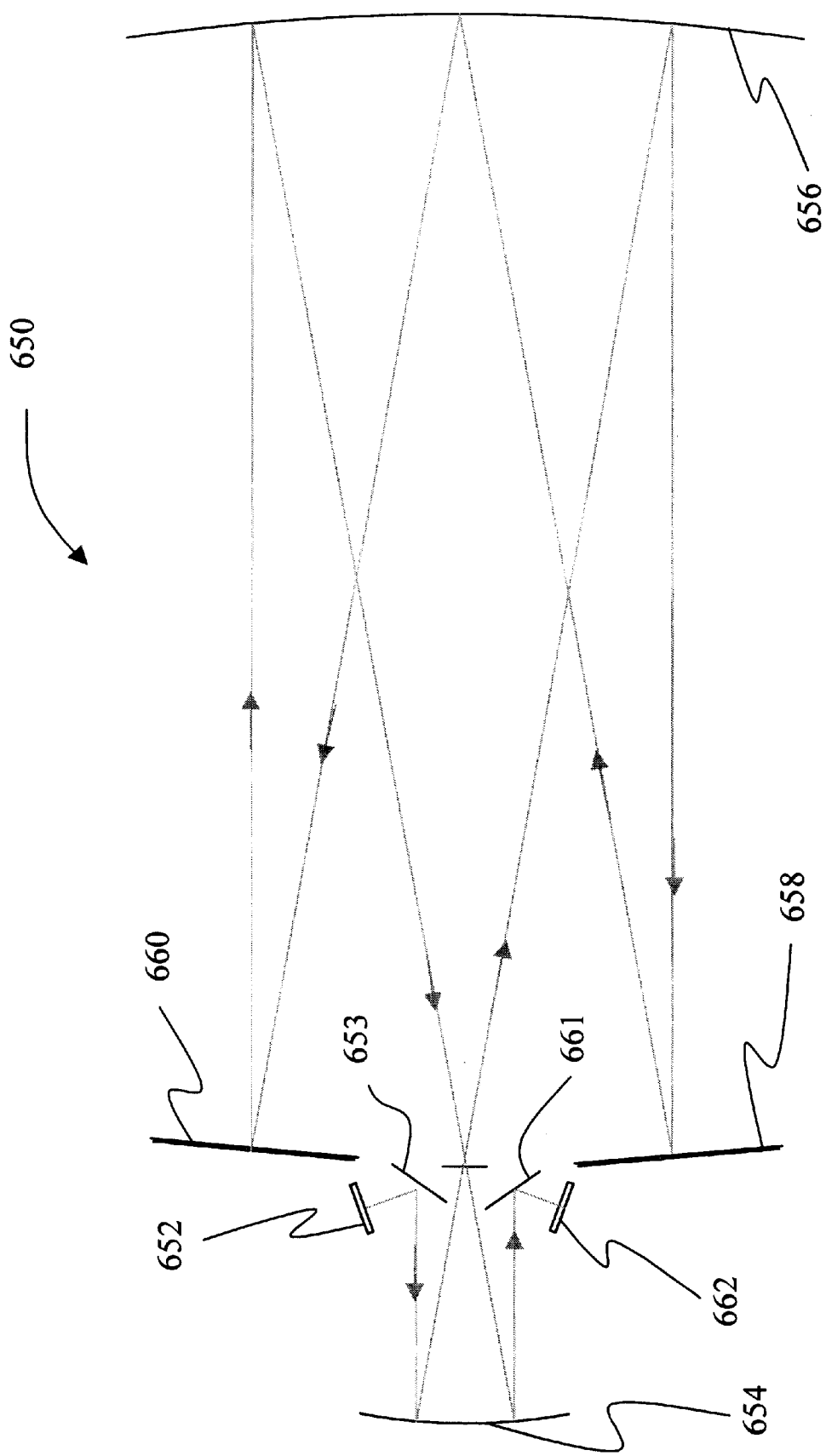
FIG. 6a is a schematic presentation of an optical switch in accordance with another embodiment of the invention wherein the input imaging optics are reflective.

FIG. 6a illustrates an optical switch 650 in accordance with another embodiment of the invention wherein the input imaging optics are reflective. A beam of light is launched into an input fiber bundle 652 having micro-lenses disposed thereon. The beam propagates to an input mirror 653 that directs the beam to a primary mirror 654. The primary mirror sends the beam to an ATO mirror 656 which directs it to a first MEMS chip 658 having micro-mirrors disposed thereon. MEMS chip 658 sends the beam back to the ATO mirror 656. From there, the beam is directed to a second MEMS chip 660. having micro-mirTors disposed thereon. MEMS chip 660 directs the beam back to the ATO mirror from where it gets send back to the primary mirror 654. The primary mirror 654 guides the beam to the output mirror 661 which in turn directs it to a designated output fiber within an output fiber bundle 662 having micro-lenses disposed thereon.

In accordance with an embodiment of the present invention, the ATO element can be a lens (ATOL) in a transmissive configuration of the switch, or a mirror (ATOM) in a reflective configuration of the switch. Furthermore, the focal length of the ATO element can correspond to the near zone length (multimode) or Rayleigh range (single mode) in accordance with one embodiment of the invention, or, alternatively, to a focal length different from the near zone length or Rayleigh range in accordance with another embodiment of the invention. The focal length of the ATO, element is taken into consideration when designing the switch, particularly with respect to size considerations of the design of the optical switch. For example, the MEMS chips including the micro-mirrors are positioned in the focal planes of the ATO element. If the focal length of the ATO element is different from the Rayleigh range or the near zone length, this will have an effect on the spot size of the light beams. The spot size of the beams has to be taken into consideration with respect to the size of the micro-mirrors, i.e. the micro-mirrors have to be sufficiently big to accommodate the beam/spot size.

FIGS. 7 to 11 illustrate further design considerations for optical switches in accordance with the present invention. The number of ports is defined by the imaging lens, the size of the MEMS chip, and the ATO lens or milTor. The number of ports that can be accommodated in the optical system is directly proportional to the size of the MEMS chip, inversely proportional to the F/#, and proportional to the square of the optical filling factor. Thus, in order to maximize the port count, it is most efficient to maximize the optical filling factor.

The optical filling factor is defined as follows $K_f = D_b/D_i$, where $D_b$ is the beam diameter and $D_i$ is the distance between the axes of two closest beams. Since the outer cladding diameter of a standard single-mode fiber is 125 µm and its mode field diameter is ~15 µm, which is defined at the level 3ω, the filling factor of the waveguide bundle can not be higher than 0.12. This optical filling factor is not affected by the magnification through the magnifying lens at the MEMS chip. However, some techniques are described below that can be used to increase the filling factor.

A first technique for increasing the filling factor is to place an array of micro-lenses on top of the waveguide bundle end-face; one micro-lens centered on the optical axis of each waveguide. Such micro-lenses increase the beam diameter but not the distance between the beam axes and thereby directly improve the filling factor.

Figure 7:
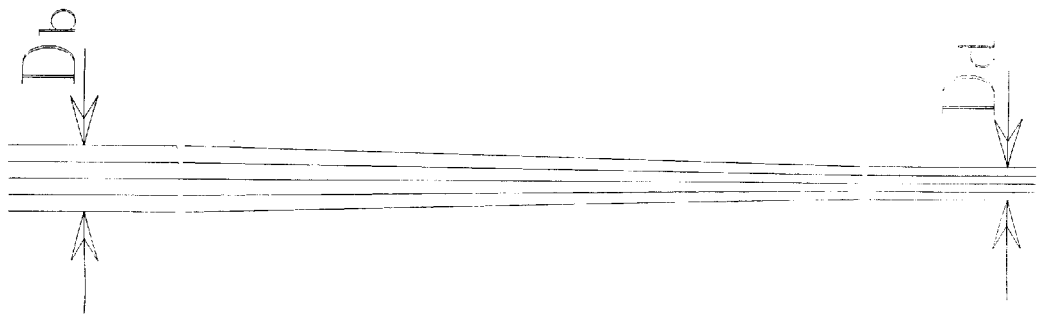
FIG. 7 is a schematic presentation of a drawn fiber bundle for increasing the filling factor.

FIG. 7 demonstrates a second technique for increasing the filling factor which is to draw the fiber bundle at an elevated temperature at which the glass is softened but which is still below the softening point of the respective glass material. The drawing diminishes the size of the bundle cross-section keeping geometrical similarity of original and drawn cross-sections. The drawing factor is defined as $K_d = D_d/D_b$, where $D_b$ is the bundle diameter of the original bundle, and $D_d$ is its diameter after drawing.

The distance between fiber axes diminishes and so does the fiber core diameter. The mode field radius $\omega$ dependence on step-index single-mode fiber core diameter is given by Marcuse s formula:

$$\omega = D(0.65 + 1.619\ V^{-1.5} + 2.879\ V^{-6})/2$$

where normalized frequency $V = D\pi\sqrt{n_1^2 - n_2^2}/\lambda$, $n_1$ and $n_2$ are refractive indexes of the fiber core and cladding, and D is the fiber core diameter. A mode field radius dependence on the drawing factor $K_d$ for SNF-28 single-mode fiber is calculated according to this formula and this dependence is presented in FIG. 8, together with the filling factor dependence.

Figure 8:
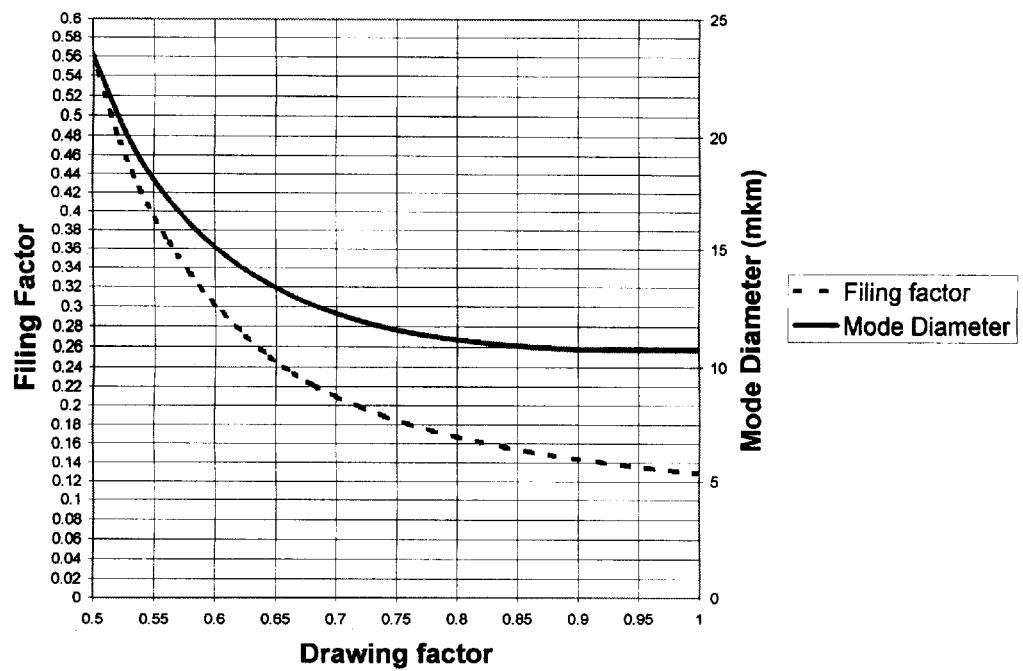
FIG. 8 is a graphic presentation of the filling factor and mode diameter dependence on the drawing factor.

Looking at the graph presented in FIG. 8 from right to left, it is seen that the mode diameter remains approximately the same down to a drawing factor ~0.85, and then increases, while the filling factor increases monotonically as a function of the drawing factor.

Figure 9:
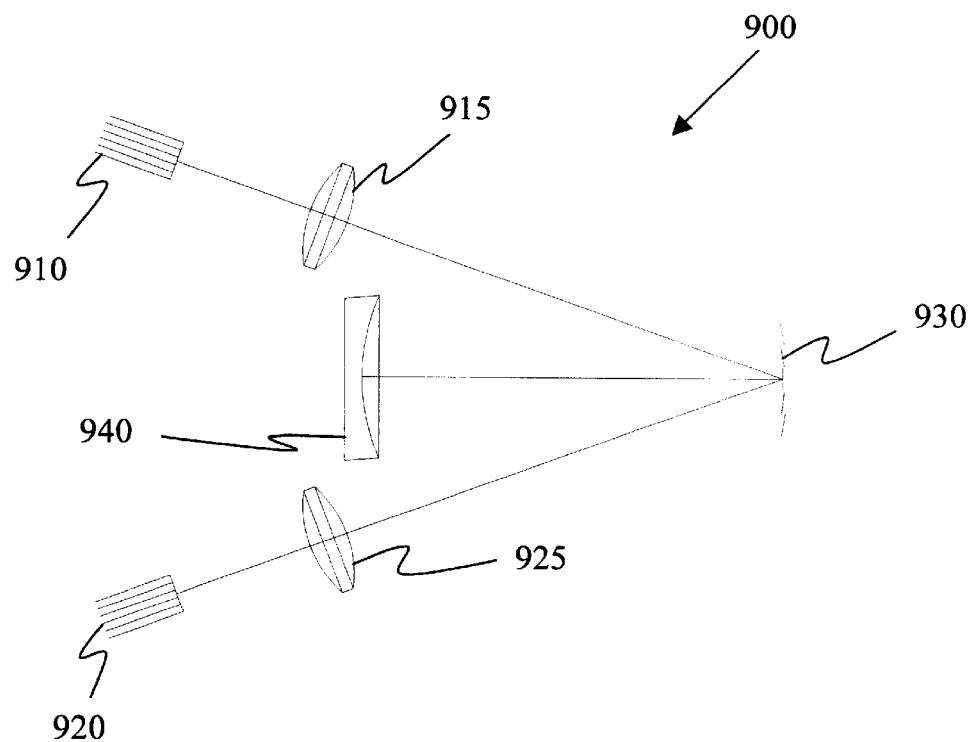
FIG. 9 shows a mirror ATO system with parallel projecting.
Figure 10:
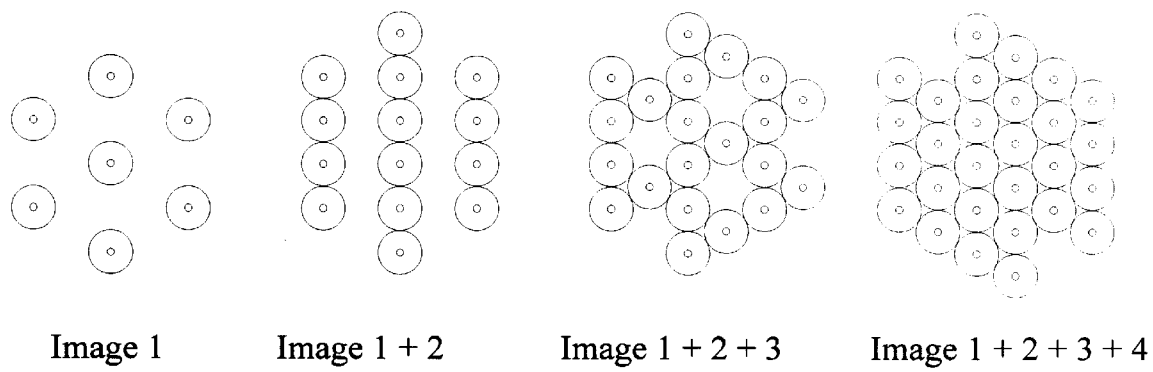
FIG. 10 is a schematic presentation of superimposing four honeycomb structures on each other.

A third possible technique for increasing the filling factor is to use a so-called "parallel projection" where several waveguide bundles, e.g. 910 and 920, and associated projecting lenses 915 and 925 image the inputs from several locations for each MEMS chip 930. Such a "parallel projection is shown in FIG. 9, which is a modification of the system presented in FIG. 6, i.e. the reflective configuration. A similar modification can be done with the system presented in FIG. 5, i.e. the transmissive configuration.

In this parallel projection scheme, there are four sub-systems consisting of waveguide bundles 910 and 920 and projecting lenses 915 and 925 placed around an ATOL (not shown) or an ATOM 940. Each of these sub-systems projects the light from its corresponding waveguide bundle 910 and 920, respectively, onto the same MEMS chip 930. Each image is oriented such that it is shifted relatively from its neighbour by half a pitch in one of the possible directions, see FIG. 10. Such a honeycomb structure can be used for the placement of waveguides and micro-mirrors of MEMS chips, as it provides the most compact positioning and the biggest number of connected channels.

With the parallel projection scheme shown in FIG. 9, the filling factor is increased two times. If nine parallel sub-systems are placed around the ATO minior 940 or ATO lens (not shown), the filling factor is increased 3 times; by using 16 systems, the filling factor is increased 4 times and so forth.

Using this technique implies requirements for increased steering range of micro-mirrors, since they should compensate the angle between optical axes of projecting systems and the axis of the ATOL or ATOM.

It is apparent that such a configuration lends itself as an example of how this system is built modularly, growing in port counts as desired or required by a customer.

A fourth possible technique to improve the filling factor is to etch away some of the cladding of the fibers.

As described in conjunction with FIGS. 5 and 6, it is necessary to clock the MEMS chip with respect to the optical axis of the imaging lens. This is necessary to deflect the beams to propagate down the optical axis of the ATO lens or mirror. As a result of this, not all of the micro-mirrors are positioned at the image plane of the imaging system. Although this does not constitute a theoretical problem, there could be practical issues associated with this, such as skew rays or missing micro-mirrors. In this case, larger micro-mirrors are used to capture the converging or diverging beams, for example.

Figure 11:
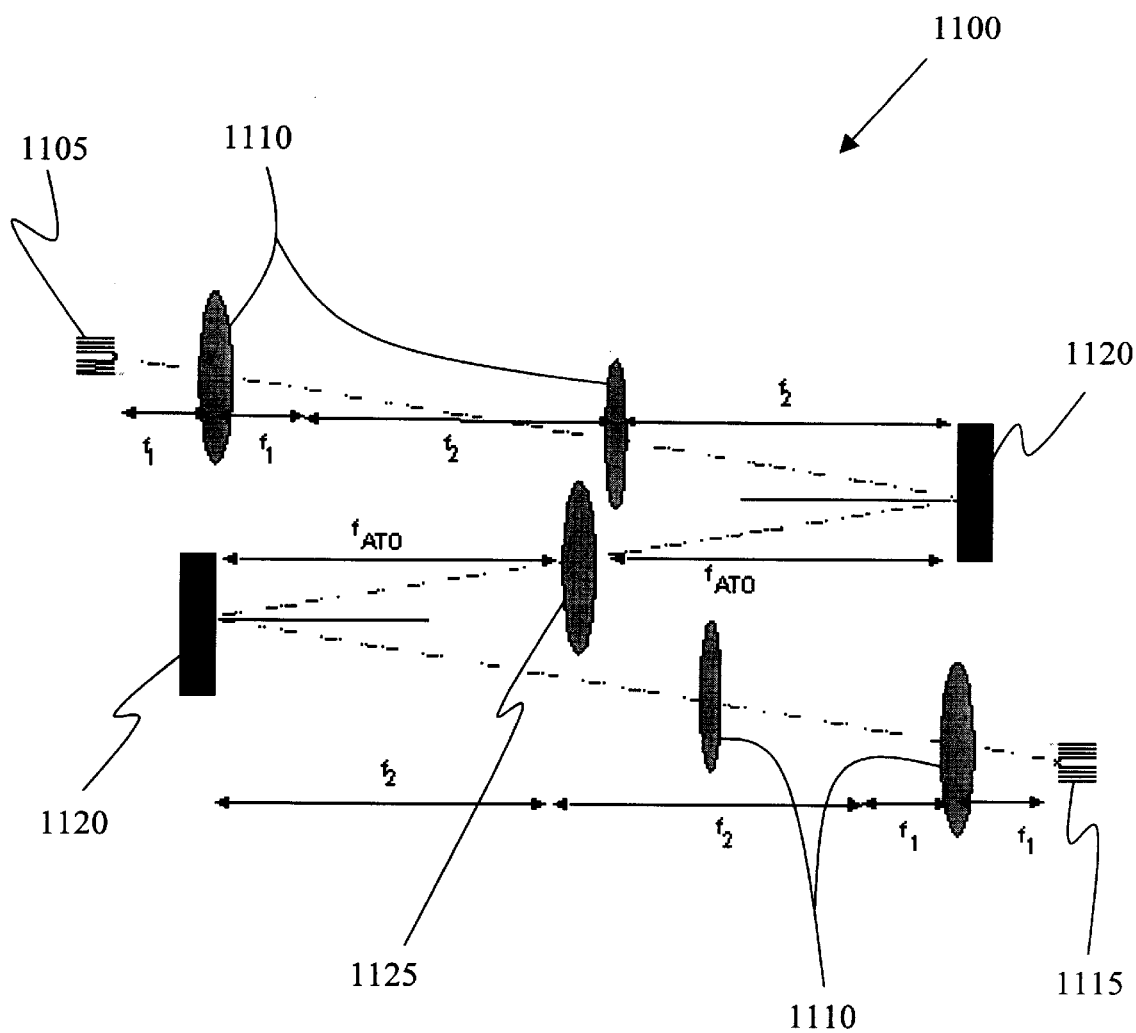
FIG. 11 shows an alternative optical system in accordance with the invention having an off-axis telecentric imaging system.

In order to prevent this problem, an alternate optical scheme 1100 is presented in FIG. 11 in a transmissive configuration, wherein the telecentric imaging lens 1110 is itself not axially co-linear. The ATOL is denoted with 1125 and the output. waveguides are denoted with 1115. With this scheme, it is seen that the images of each input waveguide 1105 are co-planar with the MEMS chip 1120. However, if desired, this scheme is designed in reflection. Optical system 1100 requires greater care in the design of the off-axes lenses in order to avoid problems with aberrations of the lenses.

In an ATO based large optical cross-connect, the routing table can be calculated based on the ATO surface profile and position. If the surface profile is simple, e.g. spherical, and will not change during operation, then the routing table of the switch during operation only depends on a reduced number of parameters, such as a focal length of the ATO (f), a position of an optical center of the ATO (x, y, z), and an orientation of an optical axis ($\theta_x$, $\theta_y$).

This reduced set of 6 parameters can be monitoredin real-time to readjust the entire switch routing table during operation.

This set of parameters can be measured through some designated calibration connections that are different from the switching routes, for example through adding a couple of actuators/detectors on the periphery of the 2D actuators array. These measurement results are then used to feedback the calculated routing table for the entire switch.

The calibration pixels can use quad detectors to provide a feedback signal and/or use frequency dithering and lock-in detection.

However, more than 6 calibration connections can be used and more than 6 parameters can be used to fully characterize the ATO.

This presents a control method for an ATO switch in which selected calibration connections are used to measure the optical characteristics of the ATO element in real time and use this information to compute a routing table for the switch.

Numerous other embodiments can be envisaged without departing from the spirit and scope of the invention.

What is claimed is:

1. An optical switch comprising:
   (a) an input port for launching a beam of light into the optical switch;
   (b) at least two output ports, each output port for selectively receiving the beam of light;
   (c) an ATO element having optical power for providing an angle to offset transformation of the beam of light; and
   (d) beam directing means for selectively directing the beam of light from the input port to a selected one of the at least two output ports along an optical path via the ATO element.

2. The optical switch as defined in claim 1 wherein the ATO element is a mirror or a lens.

3. The optical switch as defined in claim 2 wherein the beam directing means are substantially disposed near or at a focal plane of the ATO element.

4. The optical switch as defined in claim 3 wherein the ATO element has a focal length approximately equal to a near zone length or Rayleigh range of the beam of light incident on the ATO element.

5. The optical switch as defined in claim 4 wherein the ATO element is for maintaining a radius of the beam of light on the beam directing means.

6. The optical switch as defined in claim 5 wherein the ATO element is a curved mirror.

7. The optical switch as defined in claim 6 wherein the input port and the at least two output ports are disposed adjacent or interleaved to one another.

8. The optical switch as defined in claim 7 wherein the beam directing means are adjacent to the input port and the at least two output ports.

9. The optical switch as defined in claim 8 wherein the beam directing means is one of a dual mirror arrangement, a liquid crystal phase array, and a tiltable prism.

10. The optical switch as defined in claim 8 wherein the beam directing means is a MEMS device for changing an axis of the beam launched into the optical switch at the input port and the at least two output ports.

11. The optical switch as defined in claim 10 wherein the MEMS device comprises an x–y positioner for positioning a waveguide at the input port and the at least two output ports.

12. The optical switch as defined in claim 11 wherein the x-y positioner is one of a comb drive and a thermal drive.

13. The optical switch as defined in claim 3 wherein the beam directing means is an array of micro-mirrors being optically coupled with the input port and any one of the at least two output ports.

14. The optical switch as defined in claim 3 wherein the beam directing means comprise a first array of micro-mirrors near or at a first focal plane and a second array of micro-mirrors near or at a second focal plane of the ATO element.

15. The optical switch as defined in claim 3 wherein the beam directing means comprise input and output micro-mirrors, and wherein the beam directing means have a tilt with respect to light beams incident thereon for directing the light beams to an approximate center of an area occupied by respective output micro-mirrors.

16. The optical switch as defined in claim 14 wherein the first array of micro-mirrors is for tilting the beam of light, said tilt being converted to a lateral displacement using the lens and imaged onto the second array of micro-mirrors for selectively redirecting the beam to any one of the at least two output ports.

17. The optical switch as defined in claim 3 further comprising an imaging system for imaging the beam of light onto the beam directing means.

18. The optical switch as defined in claim 17 wherein the imaging system comprises reflective or transmissive elements.

19. The optical switch as defined in claim 17 wherein the imaging system comprises at least one lens.

20. The optical switch as defined in claim 17 wherein the imaging system is a telecentric imaging system.

21. The optical switch as defined in claim 20 wherein the telecentric imaging system is an off-axis telecentric imaging system.

22. The optical switch as defined in claim 2 further comprising a micro-lens centered on an optical axis of the input port for increasing an optical filling factor by increasing a beam diameter of the beam of light.

23. The optical switch as defined in claim 2 further comprising optical fibers at the input port and the at least two output ports, wherein a portion of a cladding of the optical fibers is etched for increasing an optical filling factor.

24. The optical switch as defined in claim 2 further comprising optical fibers at the input port and the at least two output ports, wherein the optical fibers have a reduced diameter for increasing an optical filling factor.

25. The optical switch as defined in claim 2 wherein a parallel projection is used for increasing an optical filling factor.

26. An optical switch comprising:
(a) an input port for launching a beam of light into the optical switch;
(b) at least two output ports, each output port for selectively receiving the beam of light;
(c) an ATO element having optical power and for providing an angle to offset transformation of the beam of light; and
(d) beam directing means for selectively directing the beam of light from the input port to a selected one of the at least two output ports along an optical path via the ATO element, said beam directing means being disposed near or at a focal plane of the ATO element.

27. The optical switch as defined in claim 26 herein the ATO element is one of a curved mirror and a transmissive lens.

28. The optical switch as defined in claim 27 wherein the ATO element has a focal length approximately equal to a Rayleigh range or near zone length of the beam of light incident thereon.

29. The optical switch as defined in claim 27 wherein the beam is being directed in a transmissive or reflective configuration.

30. An optical switch comprising an array of controllable deflecting elements for selectively switching a beam of light from an input port to a predetermined one of at least two output ports, and an ATO element optically coupled with the array of controllable deflecting elements for providing an angle to offset transformation of the beam of light, said array of controllable deflecting elements being disposed near or at a focal plane of the ATO element, and wherein a switching of the beam of light is performed along an optical path via the ATO element.

* * * * *

UNITED STATES PATENT AND TRADEMARK OFFICE
CERTIFICATE OF CORRECTION

PATENT NO.    : 6,487,334 B2
DATED         : November 26, 2002
INVENTOR(S)   : Ducellier et al.

It is certified that error appears in the above-identified patent and that said Letters Patent is hereby corrected as shown below:

<u>Column 2,</u>
Line 9, "minor" should read -- mirror --

<u>Column 10,</u>
Line 24, "micro-mirTors" should read -- micro-mirrors --

<u>Column 11,</u>
Line 60, "minior" should read -- mirror --

Signed and Sealed this

Twenty-ninth Day of April, 2003

JAMES E. ROGAN
*Director of the United States Patent and Trademark Office*